(12) United States Patent
Briehn et al.

(10) Patent No.: US 7,816,009 B2
(45) Date of Patent: *Oct. 19, 2010

(54) ORGANOSILYL FUNCTIONALIZED PARTICLES AND THE PRODUCTION THEREOF

(75) Inventors: Christoph Briehn, München (DE); Thomas Köhler, Kastl (DE); Yolker Staniek, München (DE); Richard Weidner, Burghausen (DE); Oliver Schafer, Burghausen (DE)

(73) Assignee: Wacker Chemie AG, Munich (DE)

( * ) Notice: Subject to any disclaimer, the term of this patent is extended or adjusted under 35 U.S.C. 154(b) by 974 days.

This patent is subject to a terminal disclaimer.

(21) Appl. No.: 11/240,006

(22) Filed: Sep. 30, 2005

(65) Prior Publication Data

US 2006/0020097 A1    Jan. 26, 2006

Related U.S. Application Data

(63) Continuation of application No. PCT/EP2004/003450, filed on Apr. 1, 2004.

(30) Foreign Application Priority Data

Apr. 7, 2003    (DE) ................................ 103 15 811

(51) Int. Cl.
    *B32B 9/00*    (2006.01)
(52) U.S. Cl. ........................ 428/405; 523/212; 523/213
(58) Field of Classification Search ................. 428/405; 523/212, 213
    See application file for complete search history.

(56) References Cited

U.S. PATENT DOCUMENTS

| | | | |
|---|---|---|---|
| 4,151,154 A * | 4/1979 | Berger | .......................... 523/203 |
| 5,548,053 A | 8/1996 | Weidner et al. | |
| 5,688,840 A * | 11/1997 | Ono | ............................ 523/209 |
| 2002/0197475 A1 | 12/2002 | Edelmann et al. | |
| 2003/0008974 A1 | 1/2003 | Mehnert et al. | |

FOREIGN PATENT DOCUMENTS

| | | |
|---|---|---|
| DE | 198 57 348 A1 | 6/2000 |
| EP | 0 564 253 A1 | 10/1993 |
| EP | 0 744 432 | 11/1996 |
| EP | 0 759 457 A2 | 2/1997 |
| EP | 1 245 627 A2 | 10/2002 |
| EP | 1 249 470 A2 | 10/2002 |
| JP | 63083167 A | 4/1988 |
| JP | 04-204661 | 7/1992 |
| WO | WO 93/23455 | 11/1993 |
| WO | WO 00/22052 | 4/2000 |
| WO | WO 03/014226 A1 | 2/2003 |
| WO | WO 03/018658 A1 | 3/2003 |
| WO | WO 03/035252 A1 | 5/2003 |

OTHER PUBLICATIONS

Derwent Abstract corres. to WO 00/22052 [AN2000-329998].
Chemical Abstracts Service; 1985, Wu, Xuguin et al., "Reaction between silanes and fumed silica surface" XP002287114 [AN1988:131899].
Chemical Abstracts Service; 1965, Tertykh, V.A. et al., "Surface Chemistry of functional organosilicon fillers chemically interacting with polymers" XP002287118 [AN1966:404543].
Derwent Abstract corres. to EP 1245627 [AN2003-077487].
Derwent Abstract corres. to WO 03/018658 [AN2003-522944].
Derwent Abstract corres. to Wo 03/014226 [AN2003-504944].
Chemical Abstracts Service; 1980, Morozova, E.M. et al., "Role of the interface in the polymerization of filled monomers. Properties of the composite polymers prepared". XP002287116 [AN1981:85024].
Derwent Abstract corres. to DE 19857348 [AN2000-432356].
Derwent Abstract corres. to EP 1249470 [AN2003-231553].
Derwent Abstract corres. to WO 93/23455 [AN1993-369785].
Derwent Abstract corres. to EP 0744432 [AN 1997-001220].
Derwent Abstract corres. to WO 03/035252 [AN 2003-560048].

* cited by examiner

*Primary Examiner*—Margaret G Moore
(74) *Attorney, Agent, or Firm*—Brooks Kushman P.C.

(57) ABSTRACT

Particles of metal and non-metal oxides may be readily functionalized with organosilyl groups, even in the absence of catalysts, when methylene-spaced alkoxysilanes are used for functionalizing. When an excess of alkoxy groups relative to metal-OH groups are present, the resulting functionalized particles exhibit high reactivity, particularly upon exposure to moisture. Functionalization is particularly useful with particles of organopolysiloxane resins.

18 Claims, No Drawings

ORGANOSILYL FUNCTIONALIZED PARTICLES AND THE PRODUCTION THEREOF

CROSS-REFERENCE TO RELATED APPLICATIONS

This application is a continuation of PCT application Serial No. PCT/EP2004/003450, filed Apr. 1, 2004, to which priority is claimed, and which claims the benefit of German Application No. 103 15 811.1, filed Apr. 7, 2003, to which priority is also claimed.

BACKGROUND OF THE INVENTION

1. Field of the Invention

The invention relates to organosilyl-functionalized particles and also to processes for preparing them using methylene-spaced alkoxysilanes.

2. Description of the Related Art

The term "organosilyl-functionalized particles" comprehends all particles having such functionalization, the cores of said particles being composed of metal oxides, metal mixed oxides, silicon oxide, silicon-metal mixed oxides and/or three-dimensionally crosslinked organosiloxane compounds (organopolysiloxane resins).

The application of conventional organopolysiloxane resins lies preferably in their use as binders, principally in coatings or in electrical insulation applications. Processes for preparing organopolysiloxane resins have been known for a relatively long time and are described for example in DE 198 57 348 A. Organopolysiloxane resins are prepared by hydrolyzing chlorosilanes or alkoxysilanes and then condensing the products to polysiloxanes. The direct reaction of chlorosilanes with water leads very readily to gelling. For this reason, partial alkoxylation prior to hydrolysis has proven particularly appropriate.

Where the preparation starts from alkoxysilanes, it is necessary to add hydrolysis catalysts, hydrochloric acid in the simplest case. In spite of this the hydrolysis of alkoxy groups is usually not quantitative, nor does the condensation reaction proceed to completion during resin preparation, with the consequence that fractions of hydroxyl and alkoxy groups remain in the resin. The residual content of these groups in the primary resins can be reduced, and the molecular weight increased, by subsequently employing condensation catalysts such as metal hydroxides, for example.

For the preparation of functionalized organopolysiloxane resins, EP 759 457 A, for example, cohydrolyzes functionalized organosilyl compounds with chlorosilanes or alkoxysilane building blocks; particularly in the case of hydrolysis starting from alkoxysilanes, hydroxyl groups remain in the organopolysiloxane resin. These groups can frequently not be removed completely even by condensation catalysts, and in certain cases this may adversely affect the storage stability of such organopolysiloxane resins. Thus, for example, condensation reactions of the hydroxyl groups may alter the physical properties and under certain circumstances, also the chemical properties of the products.

To solve this problem, the hydroxyl groups of the organopolysiloxane resins can be protected or specifically functionalized by subsequent reaction with suitable reagents.

The functionalization of particles which carry metal-OH and/or Si—OH groups, particularly organopolysiloxane resins, is preferably carried out using unsubstituted alkoxysilanes, such as methyltrimethoxysilane, or using functionalized and propyl-spaced alkoxysilanes, such as aminopropyltrimethoxysilane, which react under suitable reaction conditions and using catalysts, as described for example in EP 1 249 470 A and EP 1 245 627 A. In the literature a variety of catalysts such as amines and heavy metal catalysts are used, their disadvantages being mentioned in EP 564 253 A. Because of their significantly attenuated reactivity toward OH groups, propyl-spaced silanes and unfunctionalized silanes also cannot be reacted with OH-carrying particles without the addition of catalyst.

A decisive disadvantage of propyl-spaced silanes and of unfunctionalized silanes lies in the fact that monoalkoxyfunctional silanes cannot generally be used for subsequent functionalization of particles, particularly of organopolysiloxane resins, since due to their low reactivity, they react extremely slowly, if at all. The use, specifically of monoalkoxy-functional silanes of this kind, would be particularly desirable for numerous applications, since the corresponding particles can be furnished extremely easily with organic functionality by means of such functionalization. Organic functionalities of this kind serve to enhance the compatibility between particles and an organic matrix in which the particles are to be used. It is particularly favorable in this context, if the organofunctionalized particles are able to react via this functionality with the matrix and so are bound chemically into the matrix. It would therefore be desirable to have organosilyl-functionalized particles that can be prepared by silanizing with monoalkoxy-functional silanes with an increased reactivity.

Particles which have been functionalized with di- and/or trialkoxysilanes may in the presence of moisture, e.g., atmospheric humidity, enter into condensation reactions with themselves or with other alkoxysilyl compounds. This occurs as a result of hydrolysis of the alkoxysilyl groups and subsequent condensation, forming Si—O—Si bonds. In this way it is possible to achieve curing of the corresponding material, on contact with atmospheric humidity, for example. The conventional silanes mentioned above, however, possess inadequate reactivity, and so this reaction is unable to occur or may occur only very slowly and in the presence of catalysts. In that case it is necessary in general to use tin catalysts, which are problematic from toxicological standpoints. Particularly low reactivity to moisture is displayed by alkoxysilane-terminated systems if, rather than methoxysilyl groups, the even less reactive ethoxysilyl groups are employed. It would therefore be desirable to have organosilyl-functionalized particles which can be prepared by silanizing with di- and/or trialkoxy-functional silanes with an increased reactivity.

WO 03/18658 and WO 03/14226 employ functionalized alkoxysilanes for the silane termination of polydimethylsiloxanes and of organic polymers, said alkoxysilanes being notable for the fact that they contain alkoxysilyl groups which are separated by a methylene spacer from a heteroatom, thereby considerably accelerating the substitution or release of alkoxy groups. The acceleration of reaction is so considerable that the fraction of catalysts required can be reduced significantly, or it is even possible to do without the addition of catalyst.

SUMMARY OF THE INVENTION

The invention provides for organosilyl-functionalized particles by reaction of metal or silicon-bound hydroxyl groups with methylene-spaced alkoxysilanes. When the reaction products still contain alkoxy groups bonded to the methylene-spaced silicon atom of the alkoxysilane, the silanized products remain highly reactive.

DETAILED DESCRIPTION OF THE PREFERRED EMBODIMENTS

The invention provides organosilyl-functionalized particles (PS) of the general formula I, $$PR(O_{(u+t)/2})[O_{u/2}(R^2O)_{v-u}R^1{}_{3-v}SiCR^3{}_2-A]_s(O_{1/2}R^4)_t \quad (I)$$

where
PR is a particle radical comprising atoms selected from metal atoms and silicon atoms, and oxygen atoms,
A is a group selected from $R^5O-$, $R^5{}_2N-$, $(R^5O)_2OP-$, $R^5{}_2NC(O)NR^5-$, $R^6OC(O)NR^5-$, and OCN—,
$R^1$ and $R^3$ are each hydrogen or an optionally halogen-substituted hydrocarbon radical having 1-18 carbon atoms,
$R^2$ is an alkyl radical having 1-6 carbon atoms or an ω-oxaalkyl-alkyl radical having in total 2-10 carbon atoms,
$R^4$ is hydrogen or an optionally substituted monovalent hydrocarbon radical having 1-18 carbon atoms,
$R^5$ is hydrogen or an optionally halogen-, $OR^2-$, $NR^2{}_2-$ or epoxy-functional hydrocarbon radical having 1-18 carbon atoms,
$R^6$ is an optionally halogen, $OR^2-$, $NR^2{}_2-$ or epoxy-functional hydrocarbon radical having 1-18 carbon atoms,
s has a value of >0,
t has a value of greater than or equal to 0,
u has values 1, 2 or 3 and
v has values 1, 2 or 3.

The organosilyl-functionalized particles (PS) are particles functionalized with highly reactive, methylene-spaced silanes.

The organosilyl-functionalized particles (PS) can be prepared by reaction with silanes with minimal or, in particular, no addition of catalyst. Besides the methoxy-substituted silanes the corresponding ethoxy-substituted silanes possess sufficient reactivity that in this case ethanol instead of methanol is liberated as a cleavage product.

In these organosilyl-functionalized particles (PS), especially organosilyl-functionalized organopolysiloxane resins, the immobilized silanes alternatively carry no alkoxysilane groups or two or more alkoxysilane groups. The alkoxysilane-carrying particles (PS) are capable of rapid crosslinking on ingress of moisture.

Owing to the high reactivity resulting from the structure of the methylene-spaced alkoxysilanes employed, monoalkoxy-functionalized silanes are also suitable for functionalizing particles (POH) that are employed, particularly organopolysiloxane resins. In this way the properties of the particles (POH) can be modified to outstanding effect by the functional groups introduced.

The particles (PS) obtained by reacting the particles (POH) with di- and trialkoxy-functionalized silanes, by virtue of the high reactivity resulting from the structure of the methylene-spaced alkoxysilanes employed, have a high crosslinking or reaction rate on ingress of moisture or on addition of a suitably functionalized compound, and are stable on storage in the absence of moisture.

The organosilyl-functionalized particles (PS) possess preferably an average diameter of 1 nm to 100 μm, more preferably of 10 nm to 1000 nm. In the case of one particularly preferred type of particle (PS) the materials in question are organopolysiloxane resins.

Preferred metal atoms in the particles (PS) are aluminum, titanium, zirconium, and iron. Silicon atoms are particularly preferred in the particles (PS).

In group A, $R^5$ is preferably hydrogen, or an optionally halogen-, $OR^2-$, $NR^2{}_2-$ or epoxy-functional cyclic, linear or branched $C_1$ to $C_{18}$ alkyl or alkenyl radical or a $C_6$ to $C_{18}$ aryl radical. In particular $R^5$ is a $C_1$ to $C_6$ alkyl radical or a phenyl radical. Examples of organofunctional groups A are aminomethyl, N-phenylaminomethyl, N-Butylaminomethyl, N-ethylaminomethyl, N-cyclohexylaminomethyl, N,N-dibutylaminomethyl, N,N-diethylaminomethyl, methoxymethyl, ethoxymethyl, N-morpholinomethyl, isocyanatomethyl, alkylcarbamatomethyl, (meth-)acryloyloxymethyl, dialkylphosphonic ester-methyl, N-(2-aminoethyl)aminomethyl, and glycidyloxymethyl groups.

$R^6$ is preferably an optionally halogen-, $OR^2-$, $NR^2{}_2-$ or epoxy-functional cyclic, linear or branched $C_1$ to $C_{18}$ alkyl or alkenyl radical or a $C_6$ to $C_{18}$ aryl radical, particularly $C_1$ to $C_6$ alkyl or phenyl radical.

The hydrocarbon radical $R^1$ is preferably an optionally halogen-substituted alkyl, cycloalkyl, alkenyl or aryl radical, particularly $C_1$ to $C_6$ alkyl or phenyl radical. Methyl or ethyl groups are particularly preferred.

The hydrocarbon radical $R^3$ is preferably a linear or branched $C_1$ to $C_6$ alkyl radical. Methyl or ethyl groups are particularly preferred.

The organosilyl-functionalized particles (PS) are preferably solid at 20° C.

The invention further provides a process for preparing the organosilyl-functionalized particles (PS) of the general formula I, wherein a particle (POH) having free functions selected from metal-OH and Si—OH is reacted with silane of the general formula II, $$(R^2O)_vR^1{}_{3-v}Si-CR^3{}_2-A \quad (II)$$

where A, $R^1$, $R^2$, $R^3$, and v are as defined for the general formula I.

As particles (POH) it is possible to use all metal oxide and metal mixed oxide particles (e.g., aluminum oxides such as corundum, aluminum mixed oxides with other metals and/or silicon, titanium oxides, zirconium oxides, iron oxides, etc.), silicon oxide particles (e.g., colloidal silica) or silicon oxide compounds in which some valences of the silicon have been provided with organic radicals. These particles (POH) are distinguished by the fact that their surface carries metal hydroxide and/or silicon hydroxide functions via which organosilyl functionalization can take place.

Particularly preferred organosilyl-functionalized particles (PS) are organosilyl-functionalized organopolysiloxane resin particles of the general formula III, $$(R^7{}_3SiO_{1/2})_k(R^7{}_2SiO_{2/2})_l(R^7SiO_{3/2})_m(SiO_{4/2})_n[O_{u/2}(R^2O)_{v-u}R^1{}_{3-v}SiCR^3{}_2-A]_s(O_{1/2}R^4)_t \quad (III)$$

where
$R^7$ is hydrogen or an optionally halogen-substituted hydrocarbon radical having 1-18 carbon atoms,
k has a value greater than or equal to 0,
l has a value greater than or equal to 0,
m has a value greater than or equal to 0,
n has a value greater than or equal to 0,
the sum of k+l+m+n produces a value of 1, and
$R^1$, $R^2$, $R^3$, $R^4$, u, v, s, and t are as defined for the general formula I.

Preferably $R^7$ is an optionally halogen-substituted alkyl, cycloalkyl, alkenyl or aryl radical having 1-18 carbon atoms, particularly $C_1$ to $C_6$ alkyl or phenyl radical. Methyl, ethyl, and phenyl radical are particularly preferred.

The organosilyl-functionalized organopolysiloxane resin particles (PS) of the general formula III are preferably prepared by reacting an organopolysiloxane resin (POH) of the general formula IV,

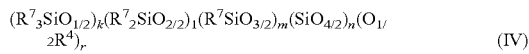
(IV)

with an organofunctionalized silane of the general formula II, where $R^7$, k, l, m, n, and r are as defined for the general formulae II and III, with the proviso that at least one $R^4$ in the organopolysiloxane resin is a hydrogen atom.

The organofunctionalized organopolysiloxane resins (PS) of the general formula III and also the organopolysiloxane resins (POH) of the general formula IV used to prepare them may be composed of two or more different units, namely $R^7_3SiO_{1/2}$ (M), $R^7_2SiO_{2/2}$ (D), $R^7SiO_{3/2}$ (T), and $SiO_{4/2}$ (Q) groups, the molar percentages of the units present being identified by the indices k, l, m, n, r, s, and t. The sum of k+l+m+n has a value of 1. For the units r preference is given to a value of 0.001 to 1.5, based on the sum of k, l, m, and p. In the case of the siloxane resin (PS) of the general formula III s must be >0.

Examples of the organopolysiloxane resins (POH) which can be used with preference are resins having an average composition of the general formula IV, with $R^7$ and $R^4$ independently of one another being hydrogen or an optionally substituted monovalent hydrocarbon radical and with values for k of 0.0-0.6, for l of 0.0-0.95, for m of 0.0-1.0, and for n of 0.0-0.6, the sum of k+l+m+n necessarily producing a value of 1, with the proviso that at least one $R^4$ in the organopolysiloxane resin is a hydrogen atom. For the units r preference is given to a value of 0.001 to 1.5, based on the sum of k, l, m, and p.

Further examples of the organopolysiloxane resins (POH) which can be used with preference are resins having an average composition of the general formula IV with $R^7$ and/or $R^4$ independently of one another being hydrogen or an optionally halogen-substituted alkyl, cycloalkyl, alkenyl or aryl radical having 1-18 carbon atoms, and with values for k of 0.0-0.6, for l of 0.0-0.95, for m of 0.0-1.0, and for n of 0.0-0.6, the sum of k+l+m+n necessarily producing a value of 1, with the proviso that at least one $R^4$ in the organopolysiloxane resin particle is a hydrogen atom. For the units r preference is given to a value of 0.01 to 1.0, based on the sum of k, l, m, and p.

Further examples of the organopolysiloxane resins (POH) which can be used with preference are resins having an average composition of the general formula IV with $R^7$ independently at each occurrence being alkyl, alkenyl or aryl radical having 1-18 carbon atoms, and with values for k of 0.0-0.15, for l of 0.0-0.7, for m of 0.2-1.0, and for n of 0.0-0.2, the sum of k+l+m+n necessarily producing a value of 1. For the units r preference is given to a value of 0.02 to 0.9, based on the sum of k, l, m, and p, and for $R^4$ preference is given, identically or independently of one another, to hydrogen or alkyl radicals having 1-4 carbon atoms.

Further examples of the organopolysiloxane resins (POH) which can be used with preference are resins having an average composition of the general formula IV with $R^7$ independently at each occurrence being alkyl, alkenyl or aryl radical having 1-18 carbon atoms, and with values for k of 0.1-0.7, for l of 0.0-0.1, for m of 0.0-0.5, and for n of 0.1-0.7, the sum of k+l+m+n necessarily producing a value of 1, with the proviso that at least one $R^4$ in the organopolysiloxane resin particle is a hydrogen atom. For the units r preference is given to a value of 0.02 to 0.30, based on the sum of k, l, m, and p, and for $R^4$ preference is given, identically or independently of one another, to hydrogen or alkyl radicals having 1-4 carbon atoms.

Likewise particularly preferred organosilyl-functionalized particles (PS) are organosilyl-functionalized colloidal silicas. These are preferably prepared by reacting a conventional colloidal silica with an organofunctionalized silane of the general formula II. The colloidal silica may be present in the form both of aqueous silica sol and of silica sol in an organic solvent. The reaction with the silane of the general formula II is accomplished preferably by simply mixing the individual components. Owing to the high reactivity of the silanes of the general formula II, neither catalysts nor significantly increased temperatures are generally necessary for the silanizing of the colloidal silica particles.

When using organofunctional alkoxysilanes of the general formula II, shortened reaction times under given reaction conditions are achieved in comparison with the corresponding propyl-spaced compounds, such as $H_2N(CH_2)_3Si(OCH_3)_3$, for example, owing to the high reactivity resulting from the structure of alkoxysilanes employed; in other words, a product (PS) can be obtained with shorter reaction times, at lower temperatures, or else without the addition of catalysts.

For preparing the organosilyl-functionalized particles (PS) of the general formula I preference is given to organosilane functionalization of the particles with silanes of the general formula II. A reaction of this kind is simple and quick to carry out and produces no by-products.

Preferably the organosilane functionalization is carried out at 0° C. to 150° C., more preferably at 20° C. to 80° C. The process can be carried out with the inclusion of solvents or else without the use of solvents in suitable reactors. Operation takes place if appropriate under reduced or under elevated pressure or at atmospheric pressure (0.1 MPa). The alcohol produced in the reaction may either remain in the product and/or be removed from the reaction mixture by application of vacuum and/or increase of temperature.

Solvents, where used, are preferably inert, especially aprotic solvents such as aliphatic hydrocarbons, such as heptane or decane, and aromatic hydrocarbons, such as toluene or xylene, for example. It is likewise possible to use ethers such as THF, diethyl ether or MTBE. Solvents or solvent mixtures having a boiling point or boiling range of up to 120° C. at 0.1 MPa are preferred.

For the reaction of the particles (POH) with the organofunctional silanes it is possible to use catalysts, particularly organic amino compounds as basic catalysts. Examples are aminopropyltrimethoxysilane, aminomethyltrimethoxysilane, aminomethylmethyldimethoxysilane, N-(2-aminoethyl)-aminopropyltrimethoxysilane, triethylamine, tributylamine, 1,4-diazabicyclo[2.2.2]octane, N,N-bis-(N,N-dimethyl-2-aminoethyl)methylamine, N,N-dimethylcyclohexylamine, N,N-dimethylphenylamine, N-ethyl-morpholinine, etc. In addition it is also possible to use acidic catalysts such as benzoyl chloride, acetic acid, trifluoroacetic acid, inorganic acids, such as hydrochloric acid, for example. These catalysts are used preferably in concentrations of 0.01%-10% by weight. The various catalysts can be used either in pure form or as mixtures of different catalysts. The catalysts are preferably tin-free.

Where, for the preparation of organosilyl-functionalized particles (PS) of the general formula I, silanes of the general formula II are used in which A has the definition $R^5_2N$—, $R^6OC(O)NR^6$—, $R^5_2NC(O)NR^5$—, OCN—, these silanes may likewise take on the role of catalyst, with the consequence that addition of further catalysts may be unnecessary.

In one preferred variant for particles (PS) of the general formula I v=1 and u=1, giving particles (PS) whose introduced organofunctional groups may if appropriate be reacted further by known processes. The monoalkoxysilanes of the general formula II (v=1) that are used for preparing these particles (PS) are sufficiently reactive that they react with the hydroxyl-functionalized particles (POH) even using little catalyst or, preferably, without catalyst. This constitutes a decisive advantage over the use of conventional propyl-spaced silanes in accordance with the prior art. Where, for preparing the organosilyl-functionalized particles (PS), organofunctional silanes of the general formula II where v=1 are used in excess in relative to the number of SiOH and/or metal-OH groups, it is possible, where appropriate, for residual SiOH and/or metal-OH groups to remain in the product. These groups can if desired then be reacted with other silanes by known processes.

In another preferred variant for organosilyl-functionalized particles (PS) of the general formula I v=2 or 3. In this case u is preferably smaller than v. This gives silane-crosslinking particles (PS) which can be crosslinked where appropriate with exposure to water (e.g., humidity) or with other OH-bearing compounds, either with themselves or with other OH-bearing compounds, to give particles of higher molecular mass or to give particles (PS) having a higher degree of crosslinking. Owing to the high reactivity resulting from the structure of the alkoxysilanes used, the organosilyl-functionalized particles (PS) of the general formula I exhibit an increased reactivity of the alkoxysilane groups with respect to water or to compounds functionalized with OH groups, leading to increased crosslinking and/or reaction rates. Particularly in comparison to conventional propyl-spacered silanes the crosslinking time or reaction time is drastically shortened. Where, for preparing the organosilyl-functionalized particles (PS), ethoxysilanes ($R^2$=ethyl) are used as organofunctional silanes of the general formula II, a particular attendant advantage is that no methanol is liberated during preparation and crosslinking.

For the preparation of the particularly preferred organosilyl-functionalized organopolysiloxane resins (PS) of the general formula III, a variety of preparation processes are possible. Particular preference is given in this case to the above-described silanizing with silanes of the general formula II.

Alternatively the organopolysiloxane resins (PS) can also be carried out via cohydrolysis of silanes of the general formula II with further resin building blocks. A further process consists in the equilibration of organopolysiloxane resins with silanes of the general formula II. Both the cohydrolysis and the equilibration can be carried out in the presence of catalysts in this case. The processes of cohydrolysis and equilibration in principle for preparing resins are widely described in the literature.

The organosilyl-functionalized particles (PS) can be used for all purposes for which it has also been possible to date to use organosilyl-functionalized particles, particularly organosilyl-functionalized organopolysiloxane resins: for example, as binders or fillers for producing coatings, including powder coatings.

All of the above symbols in the above formulae have their definitions in each case independently of one another.

In the examples below, unless indicated otherwise in each case, all amounts and percentages are by weight, all pressures are 0.10 MPa (abs.), and all temperatures are 20° C.

The resins (POH) used in the examples can be prepared in accordance with the processes described in U.S. Pat. No. 5,548,053 A, EP 640 109 A, and DE 19857348 A. The monodisperse functionalized nanoparticles were prepared in analogy to EP 744 432 A.

The OH-free MQ resin 803 employed is available under the name MQ-Harz Pulver 803 from Wacker-Chemie GmbH, Munich, Germany.

Example 1

A solution of 5.00 g of an MQ resin (resin of composition $(Me_3SiO_{1/2})_{0.4}(SiO_{4/2})_{0.6}(O_{1/2}R^4)_{0.2}$ with $R^4$ independently at each occurrence hydrogen or ethyl radical, an average molecular weight Mw of 1400 g/mol, and an OH group content of 3.4% by weight) in 10 ml of dry toluenee was added dropwise to a solution of 1.19 g of aminomethyldimethyl-methoxysilane and 5 ml of dry toluene and the mixed solutions were stirred at room temperature for 6 hours. Distillative removal of the solvent gave the organosilyl-functionalized organopolysiloxane resin as a colorless solid. $^{29}$Si NMR spectroscopy showed that all of the OH groups of the MQ resin were functionalized with aminomethyldimethylsilyl groups and that aminomethyldimethylmethoxysilane was no longer detectable.

Example 2

In the same way as in Example 1 the MQ resin was reacted with 2.17 g of cyclohexylaminomethylmethyldimethoxysilane. Distillative removal of the solvent gives the organosilyl-functionalized organopolysiloxane resin as a colorless solid. $^{29}$Si NMR spectroscopy showed that all of the OH groups of the MQ resin were functionalized with cyclohexylaminomethylsilyl groups and that cyclohexylaminomethylmethyldimethoxysilane was no longer detectable. Additionally, $^{29}$Si NMR showed that a fraction of the methoxy groups of the silane employed remains in the organosilyl-functionalized organopolysiloxane resin.

Example 3

In the same way as in Example 1 the MQ resin was reacted with 2.47 g of di(n-butyl) aminomethylmethyldimethoxysilane. Distillative removal of the solvent gives the organosilyl-functionalized organopolysiloxane resin as a colorless solid. $^{29}$Si NMR spectroscopy showed that all of the OH groups of the MQ resin were functionalized with di(n-butyl)aminomethylsilyl groups and that di(n-butyl)aminomethylmethyldimethoxysilane was no longer detectable. Additionally, $^{29}$Si NMR showed that a fraction of the methoxy groups of the silane employed remains in the organosilyl-functionalized organopolysiloxane resin.

Example 4

In the same way as in Example 1 the MQ resin was reacted with 2.23 g of morpholinomethyltrimethoxysilane. Distillative removal of the solvent gives the organosilyl-functionalized organopolysiloxane resin as a colorless solid. $^{29}$Si NMR spectroscopy showed that all of the OH groups of the MQ resin were functionalized with morpholinomethylsilyl groups and that morpholinomethyltrimethoxysilane was no longer detectable. Additionally, $^{29}$Si NMR showed that a fraction of the methoxy groups of the silane employed remains in the organosilyl-functionalized organopolysiloxane resin.

Example 5

A solution of 5.00 g of a phenyl resin (resin of composition $(Me_2SiO_{2/2})_{0.1}(MeSiO_{3/2})_{0.4}(PhSiO_{3/2})_{0.5}(O_{1/2}R^4)_{0.4}$ with $R^4$ independently at each occurrence hydrogen or ethyl radical, an average molecular weight Mw of 1600 g/mol, and an OH group content of 4.8% by weight) in 10 ml of dry toluene was added dropwise to a solution of 3.12 g of morpholinomethyltrimethoxysilane and 5 ml of dry toluene and the mixed solutions were stirred at room temperature for 6 hours. Distillative removal of the solvent gives the organosilyl-functionalized organopolysiloxane resin as a colorless solid. $^{29}$Si NMR spectroscopy showed that all of the OH groups of the phenyl resin were functionalized with morpholinomethylsilyl groups and that morpholinomethyltrimethoxysilane was no longer detectable. Additionally, $^{29}$Si NMR showed that a fraction of the methoxy groups of the silane employed remains in the organosilyl-functionalized organopolysiloxane resin.

Example 6

A solution of 5.00 g of a methyl resin (resin of composition $(MeSiO_{3/2})_{1.0}(O_{1/2}R^4)_{0.3}$ with $R^4$ independently at each occurrence hydrogen or ethyl radical, an average molecular weight Mw of 1600 g/mol, and an OH group content of 2.9% by weight) in 10 ml of dry toluene was added dropwise to a solution of 1.9 g of morpholinomethyltrimethoxysilane and 5 ml of dry toluene and the mixed solutions were stirred at room temperature for 6 hours. Distillative removal of the solvent gives the organosilyl-functionalized organopolysiloxane resin as a colorless solid. $^{29}$Si NMR spectroscopy showed that all of the OH groups of the methyl resin were functionalized with morpholinomethylsilyl groups and that morpholinomethyltrimethoxysilane was no longer detectable. Additionally, $^{29}$Si NMR showed that a fraction of the methoxy groups of the silane employed remains in the organosilyl-functionalized organopolysiloxane resin.

Example 7

The organosilyl-functionalized organopolysiloxane resin prepared in Example 6 was dissolved in 5 ml of dry toluene, applied by knifecoating in a thickness of 120 micrometers to a glass plate, and left to stand at a relative atmospheric humidity of 52% at room temperature for 48 h. Determination of the pencil hardness by a method based on ISO 15184 gave a hardness of 3 H.

Example 8

In the same way as in Example 6 the methyl resin was reacted with 1.56 g of aminomethyltriethoxysilane. Distillative removal of the solvent gives the organosilyl-functionalized organopolysiloxane resin as a colorless solid. $^{29}$Si NMR spectroscopy showed that all of the OH groups of the methyl resin were functionalized with aminomethylsilyl groups and that aminomethyltriethoxysilane was no longer detectable. Additionally, $^{29}$Si NMR showed that a fraction of the ethoxy groups of the silane employed remains in the organosilyl-functionalized organopolysiloxane resin.

Example 9

In the same way as in Example 7, the organosilyl-functionalized organopolysiloxane resins prepared in Example 8 and Comparative example 2, and the unfunctionalized methyl resin used in Example 6, were dissolved in toluene, applied by knifecoating to a glass plate, and cured. From the organosilyl-functionalized methyl resin prepared in Comparative example 2 it was not possible to produce a characterizable coating. Determination of the pencil hardness in a method based on ISO 15184 gave (a) a hardness of 4H for the coating of the aminomethyltriethoxysilane-functionalized methyl resin (from Example 10) and (b) a hardness of 2 B for the coating of the non-functionalized methyl resin.

Example 10

10.00 g of an SiO$_2$ organosol (IPA-ST from Nissan Chemicals, 30% by weight SiO$_2$, 12 nm) are admixed dropwise over 10 minutes with 0.31 g of methoxymethyltrimethoxysilane and the mixture is stirred at room temperature for 16 h. This gives a transparent dispersion. $^{29}$Si NMR spectroscopy showed that the silane employed has reacted with the colloidal SiO$_2$ and that a fraction of the methoxy groups of the silane employed remains as methoxysilyl groups in the dispersion.

Comparative Example 1

In the same way as in Example 1 the MQ resin was reacted with 1.47 g of aminopropyldimethylmethoxysilane. $^{29}$Si NMR spectroscopy showed that, in contrast to Example 1, after a reaction time of 24 hours, the reaction was not complete and unreacted aminopropyldimethylmethoxysilane was present in the mixture.

Comparative Example 2

In the same way as in Example 10 the methyl resin was reacted with 1.77 g of aminopropyltriethoxysilane. $^{29}$Si NMR spectroscopy showed that, in contrast to Example 10, after a reaction time of 24 hours, the reaction was not complete and unreacted aminopropyltriethoxysilane was present in the mixture.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:
1. Organosilyl-functionalized particles of the formula I,

where
PR is a particle radical comprising oxygen atoms and silicon atoms, selected from the group consisting of colloidal silica, organopolysiloxane resins, and mixtures thereof,
A is a radical selected from the group consisting of $R^5O$—, $R^5_2N$—, $(R^5O)_2OP$—, $R^5_2NC(O)NR^5$—, $R^6OC(O)NR^5$—, and $OCN$—, $R^1$ and $R^3$ are each hydrogen or an optionally halogen-substituted hydrocarbon radical having 1-18 carbon atoms, $R^2$ is an alkyl radical having 1-6 carbon atoms or an ω-oxaalkyl-alkyl radical having in total 2-10 carbon atoms, $R^4$ is hydrogen or an optionally substituted monovalent hydrocarbon radical having 1-18 carbon atoms, $R^5$ is hydrogen or an optionally halogen-, $OR^2$—, $NR^2{}_2$— or epoxy-functional hydrocarbon radical having 1-18 carbon atoms, $R^6$ is an optionally halogen, $OR^2$—, $NR^2{}_2$— or epoxy-functional hydrocarbon radical having 1-18 carbon atoms, s has a value >0, t has a value of greater than or equal to 0, u has values 1, 2 or 3, v has values 1, 2 or 3, wherein the organosilyl-functionalized particles have an average diameter of from about 1 nm to 1000 nm, and are prepared by functionalizing particles PR with an organosilyl-functionalizing agent dissolved in organic solvent, the functionalizing agent comprising at least one organosilicon compound of the formula (II)

$$(R^2O)_v R^1{}_{3-v}Si\text{—}CR^3{}_2\text{—}A \qquad (II).$$

2. The organosilyl-functionalized particles of claim 1, which are organopolysiloxane resins of the formula III,

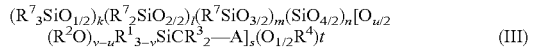

where $R^7$ is hydrogen or an optionally halogen-substituted hydrocarbon radical having 1-18 carbon atoms, k has a value greater than or equal to 0, l has a value greater than or equal to 0, m has a value greater than or equal to 0, n has a value greater than or equal to 0, the sum of k+l+m+n produces a value of 1, and $R^1$, $R^2$, $R^3$, $R^4$, u, v, s, and t are as defined for the formula I.

3. The organosilyl-functionalized particles of claim 1, wherein $R^5$ is a $C_1$ to $C_6$ alkyl radical or a phenyl radical.

4. The organosilyl-functionalized particles of claim 1, wherein $R^6$ is a $C_1$ to $C_6$ alkyl radical or a phenyl radical.

5. The organosilyl-functionalized particles of claim 1, wherein $R^1$ is a methyl or ethyl group.

6. The organosilyl-functionalized particles of claim 1, wherein $R^3$ is a $C_1$ to $C_6$ alkyl radical or a phenyl radical.

7. A process for preparing the organosilyl-functionalized particles of claim 1, wherein colloidal silica or organopolysiloxane resin particles are reacted with a functionalizing compound consisting essentially of at least one silane of the formula II, $$(R^2O)_v R^1{}_{3-v}Si\text{—}CR^3{}_2\text{—}A \qquad (II)$$

where A, $R^1$, $R^2$, $R^3$, and v are as defined for the formula I, wherein v is 1 or 2.

8. The organosilyl-functionalized particles of claim 1, which have an average particle size of from 10 nm to 1000 nm.

9. The organosilyl-functionalized particles of claim 1, which have an average particle size of from 1 nm to 100 nm.

10. The organosilyl-functionalized particles of claim 1, which have an average particle size of from 10 nm to 100 nm.

11. The organosilyl-functionalized particles of claim 8 which consist of organosilyl-functionalized organopolysiloxane resin particles.

12. The organosilyl-functionalized particles of claim 9 which consist of organosilyl-functionalized organopolysiloxane resin particles.

13. The organosilyl-functionalized particles of claim 10 which consist of organosilyl-functionalized organopolysiloxane resin particles.

14. The organosilyl-functionalized particles of claim 1 which consist of organosilyl-functionalized colloidal silica particles.

15. The organosilyl-functionalized particles of claim 10 which consist of organosilyl-functionalized colloidal silica particles.

16. The organosilyl-functionalized particles of claim 1, wherein v in formula (II) is 1.

17. The organosilyl-functionalized particles of claim 1, wherein v is 1 and u is 1.

18. The organosilyl-functionalized particles of claim 1, wherein v is 2 or 3 and u is smaller than v.

* * * * *